US010960759B2

(12) United States Patent
Park et al.

(10) Patent No.: US 10,960,759 B2
(45) Date of Patent: Mar. 30, 2021

(54) APPARATUS AND METHOD FOR AUTOMATICALLY SETTING SPEED OF VEHICLE

(71) Applicants: Hyundai Motor Company, Seoul (KR); Kia Motors Corporation, Seoul (KR)

(72) Inventors: Chan Il Park, Yeongdong-Gun (KR); Beom Jun Kim, Seoul (KR); Kyoung Jun Lee, Seoul (KR); Doo Jin Um, Seoul (KR); Dong Gu Lee, Seoul (KR); Dong Eon Oh, Seoul (KR); Hyun Jae Yoo, Seoul (KR); Min Chul Kang, Uiwang-si (KR); Dae Young Kim, Gwangmyeong-si (KR); Young Min Han, Gunpo-si (KR); Seung Geon Moon, Hwaseong-si (KR); Sung Woo Choi, Gwangmyeong-si (KR); Sung Yoon Yeo, Seoul (KR); Jee Young Kim, Yongin-si (KR); Hoi Won Kim, Gwacheon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 349 days.

(21) Appl. No.: 15/822,051

(22) Filed: Nov. 24, 2017

(65) Prior Publication Data
US 2019/0061526 A1 Feb. 28, 2019

(30) Foreign Application Priority Data

Aug. 22, 2017 (KR) .................. 10-2017-0105923

(51) Int. Cl.
*B60W 50/00* (2006.01)
*B60K 31/00* (2006.01)
*B60W 50/14* (2020.01)

(52) U.S. Cl.
CPC ............. *B60K 31/00* (2013.01); *B60W 50/14* (2013.01); *B60K 2031/0091* (2013.01);
(Continued)

(58) Field of Classification Search
CPC .......... B60K 31/00; B60K 2031/0091; B60W 50/14; B60W 2550/22; B60W 2550/402;
(Continued)

(56) References Cited

U.S. PATENT DOCUMENTS 8,983,750 B2 * 3/2015 Maruyama .......... B60W 50/085
701/93
9,365,213 B2 * 6/2016 Stenneth ............... B60W 30/00
(Continued)

FOREIGN PATENT DOCUMENTS

| JP | 2004-67089 A | 3/2004 |
|---|---|---|
| JP | 5273276 B2 | 8/2013 |
| KR | 10-2014-0016017 A | 2/2014 |

*Primary Examiner* — Masud Ahmed
(74) *Attorney, Agent, or Firm* — Morgan, Lewis & Bockius LLP

(57) ABSTRACT

An apparatus for automatically setting a speed of a vehicle may include a path guide device configured to obtain information related to a location of the vehicle, a type of a road corresponding to the location, and a speed limit of the road corresponding to the location and a controller configured to be electronically connected to the path guide device, wherein the controller is configured to activate an automatic setting mode for setting a setting speed for autonomous driving of the vehicle to a speed limit of a road corresponding to a current location of the vehicle, when the vehicle enters another type of road from the specified type of road (Continued)

in a state where the automatic setting mode is activated, release the automatic setting mode, and activate the automatic setting mode.

18 Claims, 9 Drawing Sheets

(52) U.S. Cl.
CPC ... *B60W 2050/146* (2013.01); *B60W 2552/05* (2020.02); *B60W 2555/60* (2020.02); *B60W 2556/50* (2020.02); *B60W 2720/10* (2013.01)

(58) Field of Classification Search
CPC ....... B60W 2720/10; B60W 2050/146; B60W 2550/141
See application file for complete search history.

(56) References Cited

U.S. PATENT DOCUMENTS

| | | | |
|---|---|---|---|
| 2012/0253628 A1 | 10/2012 | Maruyama | |
| 2014/0156133 A1* | 6/2014 | Cullinane | B60K 35/00 701/23 |
| 2016/0114812 A1* | 4/2016 | Maruyama | B60W 50/082 701/23 |

* cited by examiner

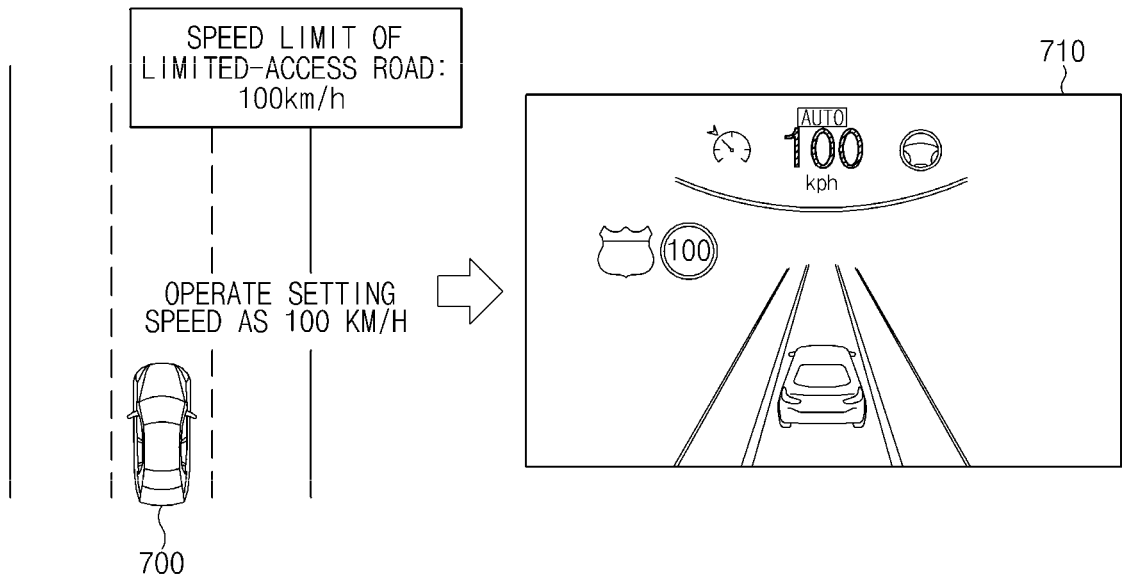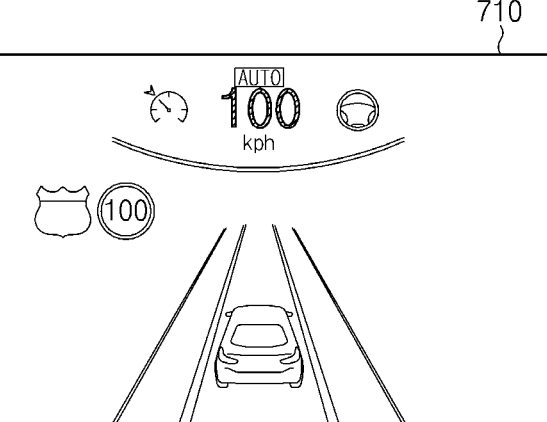
FIG. 7A  FIG. 7B
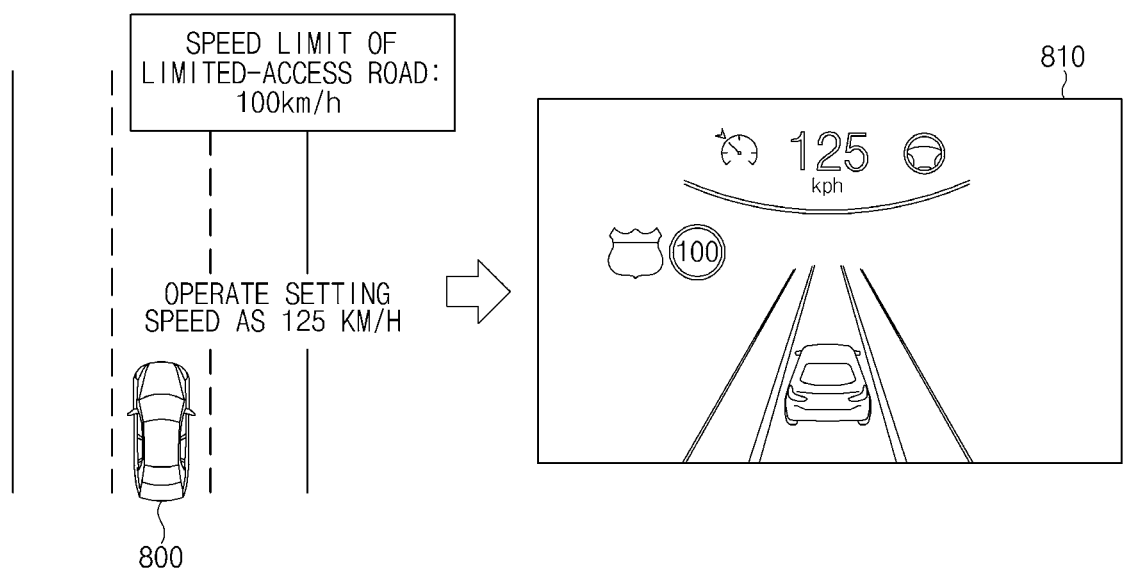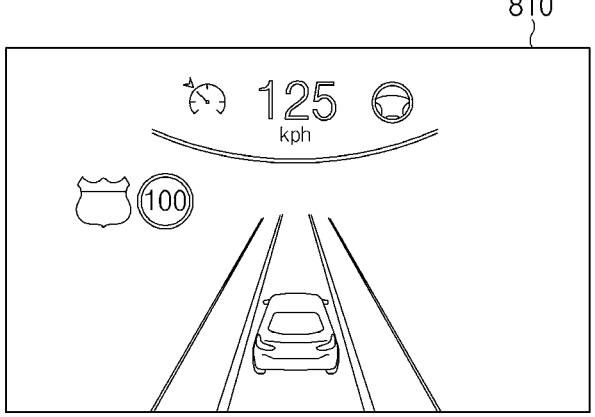
FIG. 8A  FIG. 8B

APPARATUS AND METHOD FOR AUTOMATICALLY SETTING SPEED OF VEHICLE

CROSS-REFERENCE(S) TO RELATED APPLICATIONS

The present application claims priority to Korean Patent Application No. 10-2017-0105923, filed on Aug. 22, 2017, the entire contents of which is incorporated herein for all purposes by this reference.

BACKGROUND OF THE INVENTION

Field of the Invention

The present invention relates to automatically setting a driving speed of a vehicle.

Description of Related Art

With the development of the auto industry, an autonomous driving system and a driving assistance system which may provide convenience to drivers have been developed. The above-mentioned systems may provide, for example, a variety of functions to drivers from maintaining a lane, maintaining a speed, following a forward vehicle, to changing a lane. In addition to the above-mentioned functions, the system may provide a function (for convenience of description, hereinafter referred to as "automatic setting mode") of automatically setting a speed set to maintain a speed of a vehicle.

In the related art, when a user sets a setting speed to be same as a speed limit of a road where the vehicle is being driven, the automatic setting mode may be activated. When the vehicle moves from a road (e.g., a limited-access road) where the automatic setting mode is supported to a road (e.g., a general road) where it is impossible to execute a driving assistance system, the automatic setting mode may be automatically released. However, when the vehicle moves to the road where the automatic setting mode is supported again, the user should set a setting speed to be the same as a speed limit to activate the automatic setting mode.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an apparatus and method for automatically setting a speed to simplify an operation of a user, requested to activate an automatic setting mode.

The technical problems to be solved by the present inventive concept are not limited to the aforementioned problems, and any other technical problems not mentioned herein will be clearly understood from the following description by those skilled in the art to which the present invention pertains.

According to various aspects of the present invention, an apparatus for automatically setting a speed of a vehicle may include: a path guide device configured to obtain information related to a location of the vehicle, a type of a road corresponding to the location, a speed limit of the road corresponding to the location, and a controller configured to be electronically connected to the path guide device. The controller may be configured to, when a predetermined condition is met while the vehicle is located on a specified type of road, activate an automatic setting mode for setting a setting speed for autonomous driving of the vehicle to a speed limit of the road corresponding to a current location of the vehicle, when the vehicle enters another type of road from the specified type of road in a state where the automatic setting mode is activated, release the automatic setting mode, and, when the vehicle enters the specified type of road in a state where the automatic setting mode is released due to the entrance, activate the automatic setting mode.

In an exemplary embodiment of the present invention, the controller may be configured to, when the setting speed is identical to the speed limit while the vehicle is located on the specified type of road, activate the automatic setting mode.

In another exemplary embodiment of the present invention, the controller may be configured to, when the vehicle enters the other type of road from the specified type of road in a state where the automatic setting mode is activated, store or change information indicating a setting state of the automatic setting mode and, when the vehicle enters the specified type of road in a state where the information indicating the setting state is stored or changed, activate the automatic setting mode.

In another exemplary embodiment of the present invention, the controller may be configured to release the automatic setting mode depending on an operation of a user of the vehicle in a state where the automatic setting mode is activated and, when the vehicle enters the specified type of road in a state where the automatic setting mode is released due to the provided operation, deactivate the automatic setting mode.

In yet another exemplary embodiment of the present invention, the controller may be configured to, when a pedal included in the vehicle is operated in a state where the automatic setting mode is activated, release the automatic setting mode and, when the vehicle enters the specified type of road in a state where the automatic setting mode is released due to the operation of the pedal, deactivate the automatic setting mode.

In yet another exemplary embodiment of the present invention, the apparatus may further include an input device configured to include one or more buttons. The controller may be configured to, when an input is provided to a cancel button included in the input device in a state where the automatic setting mode is activated, release the automatic setting mode and, when the vehicle enters the specified type of road in a state where the automatic setting mode is released due to the input, deactivate the automatic setting mode.

In yet another exemplary embodiment of the present invention, the apparatus may further include an input device configured to include one or more buttons. The controller may be configured to, when an input is provided to a resume button included in the input device in a state where the automatic setting mode is released due to the entrance, activate the automatic setting mode. The resume button may be a button for setting the setting speed to a previous setting speed of the vehicle.

In yet another exemplary embodiment of the present invention, the apparatus may further include an input device configured to include one or more buttons. The controller may be configured to, when an input is provided to a setting button included in the input device in a state where the automatic setting mode is released due to the entrance, deactivate the automatic setting mode. The setting button may be a button for setting the setting speed to a current driving speed of the vehicle.

In yet another exemplary embodiment of the present invention, the apparatus may further include a display configured to be electronically connected to the controller. The controller may be configured to, when the automatic setting mode is activated, output at least part of text, an icon, or an image, indicating that the automatic setting mode is activated, on the display.

In yet another exemplary embodiment of the present invention, the apparatus may further include a display configured to be electronically connected to the controller. The controller may be configured to, when the automatic setting mode is activated, change at least part of one or more objects displayed on the display.

In yet another exemplary embodiment of the present invention, the apparatus may further include a speaker configured to be electronically connected to the controller. The controller may be configured to, when the automatic setting mode is activated, output a notification sound using the speaker.

According to various aspects of the present invention, a method for automatically setting a speed of a vehicle includes when a predetermined condition is met while the vehicle is located on a specified type of road, activating an automatic setting mode for setting a setting speed for autonomous driving of the vehicle to a speed limit of a road corresponding to a current location of the vehicle, when the vehicle enters another type of road from the specified type of road in a state where the automatic setting mode is activated, releasing the automatic setting mode, and, when the vehicle enters the specified type of road in a state where the automatic setting mode is released due to the entrance, reactivate the automatic setting mode.

In an exemplary embodiment of the present invention, the activating may include, when the setting speed is identical to the speed limit while the vehicle is located on the specified type of road, activating the automatic setting mode.

In yet another exemplary embodiment of the present invention, the releasing of the automatic setting mode may include, when the vehicle enters the other type of road from the specified type of road in a state where the automatic setting mode is activated, storing or changing information indicating a setting state of the automatic setting mode. The reactivating may include, when the vehicle enters the specified type of road in a state where the information indicating the setting state is stored or changed, reactivating the automatic setting mode.

In yet another exemplary embodiment of the present invention, the method may further include releasing the automatic setting mode depending on an operation of a user of the vehicle in a state where the automatic setting mode is activated and, when the vehicle enters the specified type of road in a state where the automatic setting mode is released due to the operation, deactivating the automatic setting mode.

According to various aspects of the present invention, an apparatus for automatically setting a speed of a vehicle may include: a path guide device configured to obtain information related to a location of the vehicle, information related to a type of a road corresponding to the location, and information related to a speed limit of the road corresponding to the location and a controller configured to be electronically connected to the path guide device. The controller may be configured to: when a predetermined condition is met while the vehicle is located on a specified type of road, activate an automatic setting mode for setting a setting speed for autonomous driving of the vehicle to a speed limit of a road corresponding to a current location of the vehicle, when the vehicle enters the specified type of road again in a state where the automatic setting mode is released due to a change in the location of the vehicle, reactivating the automatic setting mode.

In yet another exemplary embodiment of the present invention, the controller may be configured to, when the automatic setting mode is released due to the change in the location of the vehicle, store or change information indicating a setting state of the automatic setting mode and, when the vehicle enters the specified type of road again in a state where the information indicating the setting state is stored or changed, reactivating the automatic setting mode.

In yet another exemplary embodiment of the present invention, the controller may be configured to, when the location of the vehicle is changed from the specified type of road to another type of road, release the automatic setting mode.

In yet another exemplary embodiment of the present invention, the controller may be configured to, when the vehicle enters the specified type of road again in a state where the automatic setting mode is released by an operation of a user of the vehicle, deactivate the automatic setting mode.

In yet another exemplary embodiment of the present invention, the operation of the user may include an operation for a pedal or an input device included in the vehicle.]

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 7A and FIG. 7B are drawings illustrating an exemplary operation of an apparatus for automatically setting a speed of a vehicle according to an exemplary embodiment of the present invention;

FIG. 8A and FIG. 8B are drawings illustrating an exemplary operation of an apparatus for automatically setting a speed of a vehicle according to an exemplary embodiment of the present invention;

Figure 1:
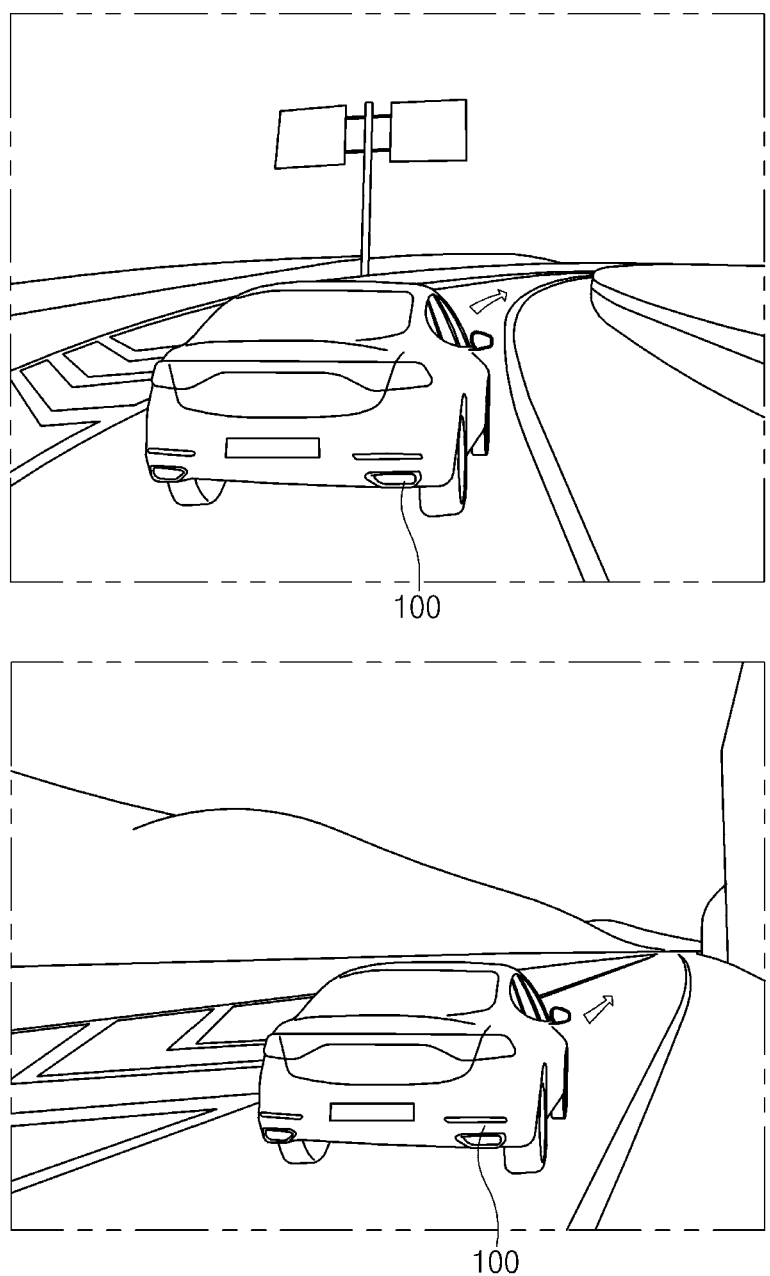
FIG. 1 is a drawing illustrating an operation environment of an apparatus for automatically setting a speed of a vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Furthermore, in describing an exemplary embodiment of the present invention, when it is determined that a detailed description of related well-known configurations or functions blurs the gist of an exemplary embodiment of the present invention, it will be omitted.

In describing elements of embodiments of the present invention, the terms $1^{st}$, $2^{nd}$, first, second, A, B, (a), (b), and the like may be used herein. These terms are only used to distinguish one element from another element, but do not limit the corresponding elements irrespective of the nature, turn, or order of the corresponding elements. Unless otherwise defined, all terms used herein, including technical or scientific terms, have the same meanings as those generally understood by those skilled in the art to which the present invention pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a drawing illustrating an operation environment of an apparatus for automatically setting a speed of a vehicle according to an exemplary embodiment of the present invention.

Referring to FIG. 1, a vehicle 100 according to an exemplary embodiment of the present invention may be driven on a limited-access road (e.g., a highway). While the vehicle 100 is driven on a main line of the limited-access road, a driving assistance system providing a function of following a forward vehicle, maintaining a setting speed, and/or maintaining a lane may be activated. While the driving assistance system is activated, the vehicle 100 may activate an automatic setting mode of setting a setting speed for autonomous driving of the vehicle 100 to a speed limit of a road corresponding to a current location of the vehicle 100. The automatic setting mode may be activated on, for example, the main line of the limited-access road. When a user of the vehicle 100 sets a setting speed to be identical to a speed limit of a road where the vehicle 100 is currently being driven, the automatic setting mode may be activated. Herein, the setting speed may be a target speed of the vehicle 100 while the driving assistance system is activated. While the automatic setting mode is activated, the setting speed may be set to the speed limit of the road where the vehicle 100 is driven. The vehicle 100 may be driven at the same setting speed as the speed limit when there is no interference of another vehicle. The vehicle 100 may enter a branch road (or an off-ramp) connected to another road at an intersection. When the vehicle 100 enters the off-ramp, the driving assistance system and the automatic setting mode may be released.

Thereafter, the vehicle 100 may enter a main line of a limited-access road again through another branch road (or an on-ramp). When the vehicle 100 reenters the main line of the limited-access road, the driving assistance system may be reactivated. In the present case, setting a setting speed again to be the same as a speed limit to activate the automatic setting mode may result in inconvenience to the user. When the automatic setting mode is released irrespective of an intention of the user, for example, when the automatic setting mode is released as the vehicle 100 moves from a main line of the limited-access road to a branch road, and when the vehicle 100 enters the limited-access road where it is possible to use the automatic setting mode again, the vehicle 100 according to an exemplary embodiment of the present invention may automatically activate the automatic setting mode. Hereinafter, a description will be provided more specifically to elements and operations of an apparatus for automatically setting a speed, included in the vehicle 100 according to an exemplary embodiment of the present invention.

Figure 2:
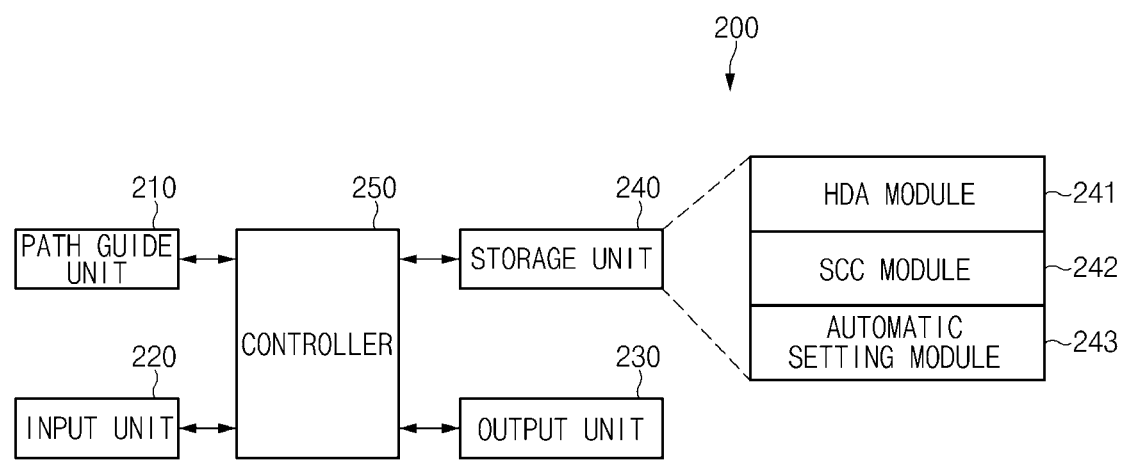
FIG. 2 is a diagram illustrating a configuration of an apparatus for automatically setting a speed of a vehicle according to an exemplary embodiment of the present invention.

FIG. 2 is a diagram illustrating a configuration of an apparatus for automatically setting a speed of a vehicle according to an exemplary embodiment of the present invention.

Referring to FIG. 2, an apparatus 200 for automatically setting a speed of a vehicle may include a path guide device 210, an input device 220, an output device 230, a storage device 240, and a controller 250. In FIG. 2, for convenience of distinguishing elements, the path guide device 210, the input device 220, the output device 230, the storage device 240, and the controller 250 are shown as separate elements. Embodiments are not limited thereto. For example, at least portions of the path guide device 210, the input device 220, the output device 230, the storage device 240, and the controller 250 may be designed in an integrated form or in a discrete form, depending on an implementation method.

The path guide device 210 may obtain a variety of information associated with a location of the vehicle. The path guide device 210 may be, for example, a navigation device. According to an exemplary embodiment of the present invention, the path guide device 210 may obtain information related to a location of the vehicle, information related to a type of a road corresponding to the location, and information related to a speed limit of the road corresponding to the location. For example, the path guide device 210 may obtain information related to a location of the vehicle and may obtain information related to a type of a road where the vehicle is located (e.g., a main line of a limited-access road, an off-ramp or an on-ramp of the limited-access road, or a general road) and information related to a speed limit (e.g., 100 km/h or 110 km/h) of the road where the vehicle is located, based on map data. The information obtained by the path guide device 210 may be transmitted to the controller 250.

The input device 220 may be a device configured for receiving an external input (e.g., a user of the vehicle). The input device 220 may include a hardware button, a lever, or the like and may include a button displayed on a touch screen display. For example, the input device 220 may include a cancel button, a resume button, a setting button, and the like. The cancel button may be, for example, a button for releasing the driving assistance system or the automatic setting mode. The resume button may be, for example, a button for setting a setting speed to a previous setting speed of the vehicle. The setting button may be, for example, a button for setting a setting speed to a current driving speed of the vehicle. An input obtained by the input device 220 may be transmitted to the controller 250.

The output device 230 may be a device configured for outputting a variety of sensuously recognizable information externally. The output device 230 may provide, for example, visual information and auditory information to the user of the vehicle. According to an exemplary embodiment of the present invention, the output device 230 may include a display and a speaker. The output device 230 may provide information associated with the automatic setting mode to the user of the vehicle.

The storage device 240 may include a volatile memory and/or a non-volatile memory. The storage device 240 may store data used by an element of the apparatus 200 for automatically setting the speed of the vehicle. The storage device 240 may include, for example, a highway driving assist (HDA) module 241, a smart cruise control (SCC) module 242, and an automatic setting module 243. The HDA module 241 may provide information regarding whether an HDA system is activated to the automatic setting module 243. The SCC module 242 may provide information regarding a setting speed of the vehicle to the automatic setting module 243. The automatic setting module 243 may provide information regarding whether the automatic setting mode is activated and information regarding a speed of the vehicle to the SCC module 242. The modules 241, 242, and 243 stored in the storage device 240 may be executed by the controller 250 and may perform various operations.

The controller 250 may be electronically connected to the path guide device 210, the input device 220, the output device 230, and the storage device 240. The controller 250 may be configured to control the path guide device 210, the input device 220, the output device 230, and the storage device 240 and may be configured to perform data processing and an arithmetic operation.

According to an exemplary embodiment of the present invention, when a predetermined condition is met while the vehicle is located on a specified type of road, the controller 250 may be configured to activate the automatic setting mode. According to an exemplary embodiment of the present invention, when a setting speed is identical to a speed limit while the vehicle is located on the specified type of road, the controller 250 may be configured to activate the automatic setting mode. The specified type of road may be, for example, a type of a road where it is possible to activate the automatic setting mode and may be a main line of a highway. For example, when the user sets a setting speed to be same as a speed limit while the vehicle is located on a main line of a highway, the controller 250 may be configured to activate the automatic setting mode. When the automatic setting mode is activated, the vehicle may automatically change a setting speed depending on a change in a speed limit of a road where the vehicle is located.

According to an exemplary embodiment of the present invention, when the vehicle enters the specified type of road again in a state where the automatic setting mode is released due to a change in a location of the vehicle, the controller 250 may reactivating the automatic setting mode.

According to an exemplary embodiment of the present invention, the controller 250 may automatically release the automatic setting mode based on a change in a location of the vehicle. According to an exemplary embodiment of the present invention, when a location of the vehicle is changed from the specified type of road to another type of road, the controller 250 may be configured to automatically release the automatic setting mode. For example, when the vehicle enters a branch road (or an off-ramp) from a main line of a limited-access road in a state where the automatic setting mode is activated, the controller 250 may automatically release the automatic setting mode.

According to an exemplary embodiment of the present invention, when the automatic setting mode is released due to a change in a location of the vehicle, the controller 250 may be configured to store information indicating a setting state of the automatic setting mode in the storage device 240 or may change information indicating a setting state stored in the storage device 240. For example, when the vehicle enters a branch road (or an off-ramp) from a main line of a limited-access road in a state where the automatic setting mode is activated, the controller 250 may be configured to store or change information indicating that the automatic setting mode is unintentionally released. The above-mentioned information may be, for example, a flag. The controller 250 may generate a flag or may change a flag from "0" to "1".

According to an exemplary embodiment of the present invention, when the vehicle enters the specified type of road in a state where the automatic setting mode is released due to entrance from the specified type of road to another type of road, the controller 250 may automatically activate the automatic setting mode. For example, when the vehicle enters a highway in a state where information indicating a setting state of the automatic setting mode is stored or changed (e.g., when a flag is generated or when a flag is "1"), the controller 250 may automatically reactivate the automatic setting mode. The controller 250 may be configured to determine that the automatic setting mode is unintentionally released based on information indicating a setting state, and may automatically reactivate the automatic setting mode when the vehicle enters a road where it is possible to activate the automatic setting mode.

According to an exemplary embodiment of the present invention, when the vehicle reenters the specified type of road in a state where the automatic setting mode is released by an operation of the user of the vehicle, the controller 250 may deactivate the automatic setting mode. For example, the controller 250 may be configured to release the automatic setting mode depending on an operation of the user of the vehicle in a state where the automatic setting mode is activated, and may deactivate the automatic setting mode when the vehicle enters the specified type of road in a state where the automatic setting mode is released due to an operation of the user. The operation of the user may include, for example, an operation for a pedal, the input device 220, or the like, included in the vehicle.

For example, when a pedal (e.g., a brake pedal or an accelerator pedal) included in the vehicle is operated in a state where the automatic setting mode is activated, the controller 250 may release the automatic setting mode. When the vehicle enters the specified type of road in a state where the automatic setting mode is released due to the operation of the pedal, the controller 250 may determine that the automatic setting mode is released according to an intention of the user, and may deactivate the automatic setting mode.

For another example, when an input is provided to the cancel button included in the input device 220 in a state where the automatic setting mode is activated, the controller 250 may release the automatic setting mode. When the vehicle enters the specified type of road in a state where the automatic setting mode is released due to an input to the cancel button, the controller 250 may determine that the automatic setting mode is released according to the intention of the user and may deactivate the automatic setting mode.

According to an exemplary embodiment of the present invention, when an input is provided to the setting button included in the input device 220 in a state where the automatic setting mode is released due to entrance from the specified type of road to another type of road, the controller 250 may deactivate automatic setting mode and may determine a setting speed to a current speed of the vehicle. Since the setting button is a button for setting a setting speed as a current speed of the vehicle, when an input is provided to the setting button, the controller 250 may fail to activate the automatic setting mode.

According to an exemplary embodiment of the present invention, when an input is provided to the resume button included in the input device 220 in a state where the automatic setting mode is released due to the entrance, the controller 250 may activate the automatic setting mode. Since the resume button is a button for setting a setting speed to be the same as a previous setting speed in a state where a driving assistance system is released, when an input is provided to the resume button, the controller 250 may regard the user of the vehicle as having an intention to use the automatic setting mode and may activate the automatic setting mode.

According to an exemplary embodiment of the present invention, when the automatic setting mode is activated, the controller 250 may output visual information and/or auditory information via the output device 230. A description will be provided more specifically of the outputting of the visual information and/or auditory information with reference to FIG. 7, FIG. 8, and FIG. 9.

Due to the above-mentioned operations, an advantageous effect of the present invention for automatically activating the automatic setting mode again may be accomplished by reflecting an intention of the user.

Figure 3:
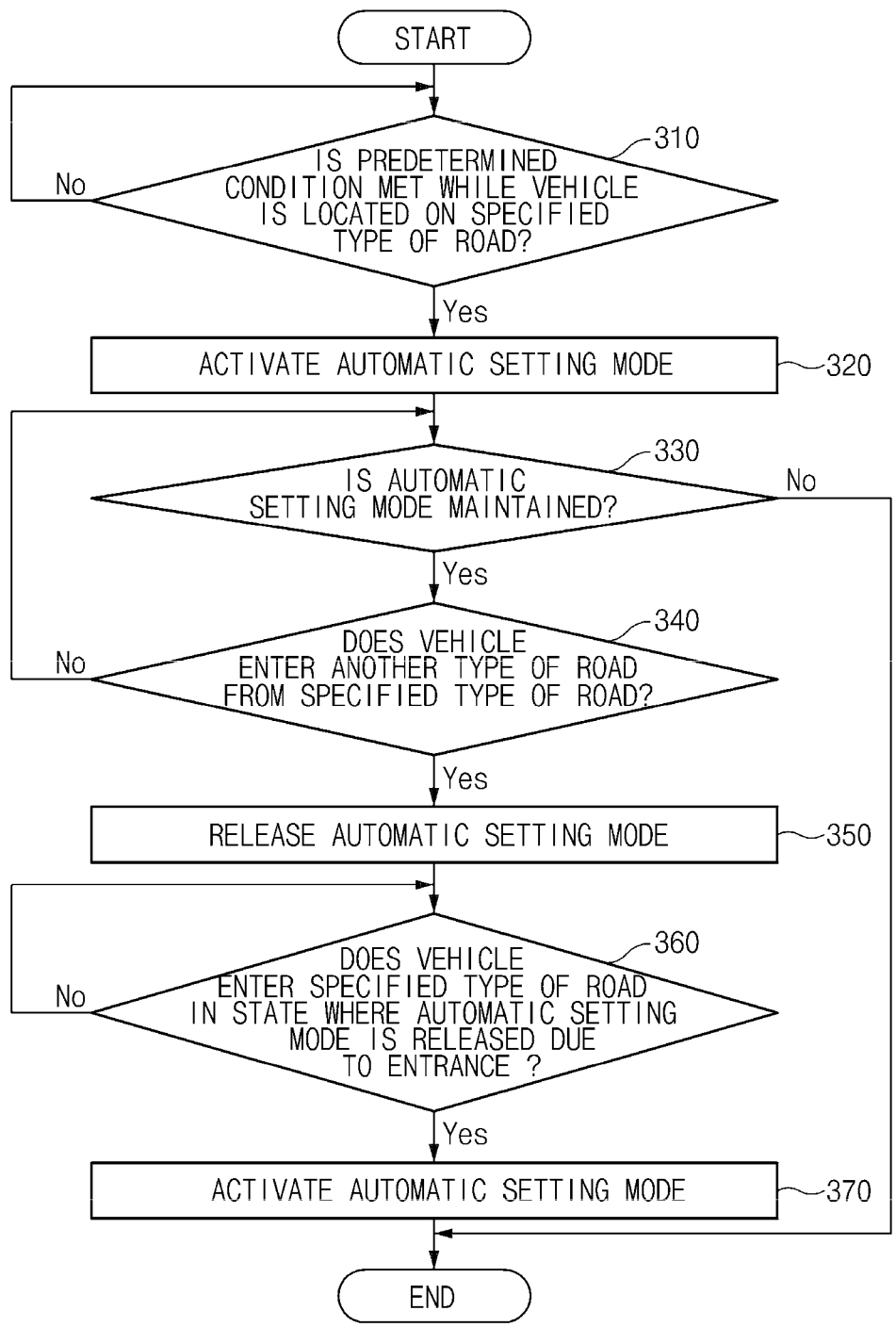
FIG. 3 is a flowchart illustrating a method for automatically setting a speed of a vehicle according to an exemplary embodiment of the present invention.

FIG. 3 is a flowchart illustrating a method for automatically setting a speed of a vehicle according to an exemplary embodiment of the present invention.

Hereinafter, it is assumed that an apparatus 200 of FIG. 2 performs a process of FIG. 3. Furthermore, in a description of FIG. 3, an operation referred to as being performed by an apparatus may be understood as being controlled by the controller 250 of the apparatus 200.

In operation 310, the apparatus 200 may determine whether a predetermined condition is met while a vehicle is located on a specified type of road. For example, the apparatus 200 may determine whether a setting speed for a driving assistance system while the vehicle is located on a main line of a limited-access road is identical to a speed limit of a road where the vehicle is being driven.

When the predetermined condition is met, in operation 320, the apparatus 200 may activate an automatic setting mode. For example, when a setting speed is set to 100 km/h on a main line of a limited-access road where a speed limit is 100 km/h, the apparatus 200 may activate the automatic setting mode of changing the setting speed to be the same as the speed limit although the speed limit changed.

In operation 330, the apparatus 200 may determine whether the automatic setting mode is maintained. For example, the apparatus 200 may determine whether the automatic setting mode is continuously activated on the main line of the limited-access road or whether the automatic setting mode is not released by an operation of a user.

In operation 340, the apparatus 200 may determine whether the vehicle enters another type of road from the specified type of road. For example, the apparatus 200 may determine whether the vehicle enters another type of road, including a branch road or a general road, from a main line of the limited-access road based on information related to a location of the vehicle or information related to a type of road corresponding to the location of the vehicle.

When the vehicle enters the other type of road, in operation 350, the apparatus 200 may release the automatic setting mode. For example, when the vehicle enters the branch road or the general road, the apparatus 200 may release the driving assistance system and the automatic setting mode.

In operation 360, the apparatus 200 may determine whether the vehicle enters the specified type of road in a state where the automatic setting mode is released due to the entrance. For example, when the vehicle reenters a main line of the limited-access road, the apparatus 200 may determine whether the automatic setting mode is previously released due to the entrance to another type of road or an operation of the user.

When the automatic setting mode is released due to the entrance to the other type of road and when the vehicle enters the specified type of road, in operation 370, the apparatus 200 may activate the automatic setting mode. For example, when the automatic setting mode is released due to movement of the vehicle and when the vehicle reenters a main line of the limited-access road, the apparatus 200 may regard a user as having an intention to use the automatic setting mode and may automatically activate the automatic setting mode.

Figure 4:
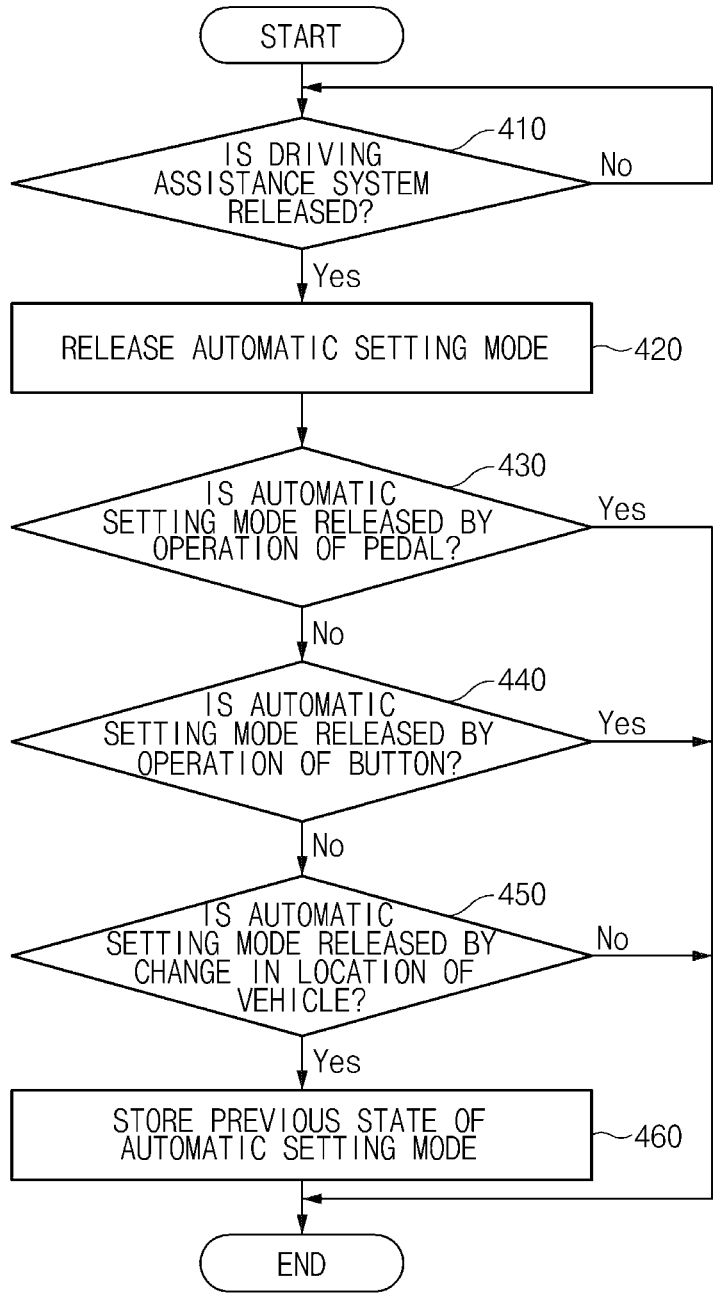
FIG. 4 is a flowchart illustrating a method for automatically setting a speed of a vehicle according to an exemplary embodiment of the present invention.

FIG. 4 is a flowchart illustrating a method for automatically setting a speed of a vehicle according to an exemplary embodiment of the present invention.

Hereinafter, it is assumed that an apparatus 200 of FIG. 2 performs a process of FIG. 4. Furthermore, in a description of FIG. 4, an operation referred to as being performed by an apparatus may be understood as being controlled by the controller 250 of the apparatus 200.

Referring to FIG. 4, in operation 410, the apparatus 200 may determine whether a driving assistance system is released. When the driving assistance system is released, in operation 420, the device may release an automatic setting mode. The driving assistance system is released and the automatic setting mode may be released by an operation of the user or automatically.

In operation 430, the apparatus 200 may determine whether the automatic setting mode is released by an operation of a pedal. For example, the apparatus 200 may determine whether the automatic setting mode is released according to an intention of the user, for example, an operation of a brake pedal, an accelerator pedal, or the like.

In operation 440, the apparatus 200 may determine whether the automatic setting mode is released by an operation of a button. For example, the apparatus 200 may determine whether the automatic setting mode is released according to an intention of the user, for example, an input on a cancel button for releasing the driving assistance system.

In operation 450, the apparatus 200 may determine whether the automatic setting mode is released by a change in a location of the vehicle. For example, the apparatus 200 may determine whether the automatic setting mode is unintentionally released as the vehicle moves from a main line of a highway to an off-ramp.

Operations 430, 440, and 450 may be operations for determining whether the automatic setting mode is released by an operation of the user of the vehicle or automatically and may be changed in any order where operations 430 to 450 are performed. A portion of the operations 430, 440, and 450 may be omitted. Furthermore, the apparatus 200 may further perform another operation for determining whether the automatic setting mode is released by an operation of the user or automatically.

When the automatic setting mode is automatically released, in operation 460, the apparatus 200 may store a previous state of the automatic setting mode. For example, the apparatus 200 may store information related to a previous state indicating that the automatic setting mode is unintentionally released to determine that the user has the intention to reuse the automatic setting mode later.

Figure 5:
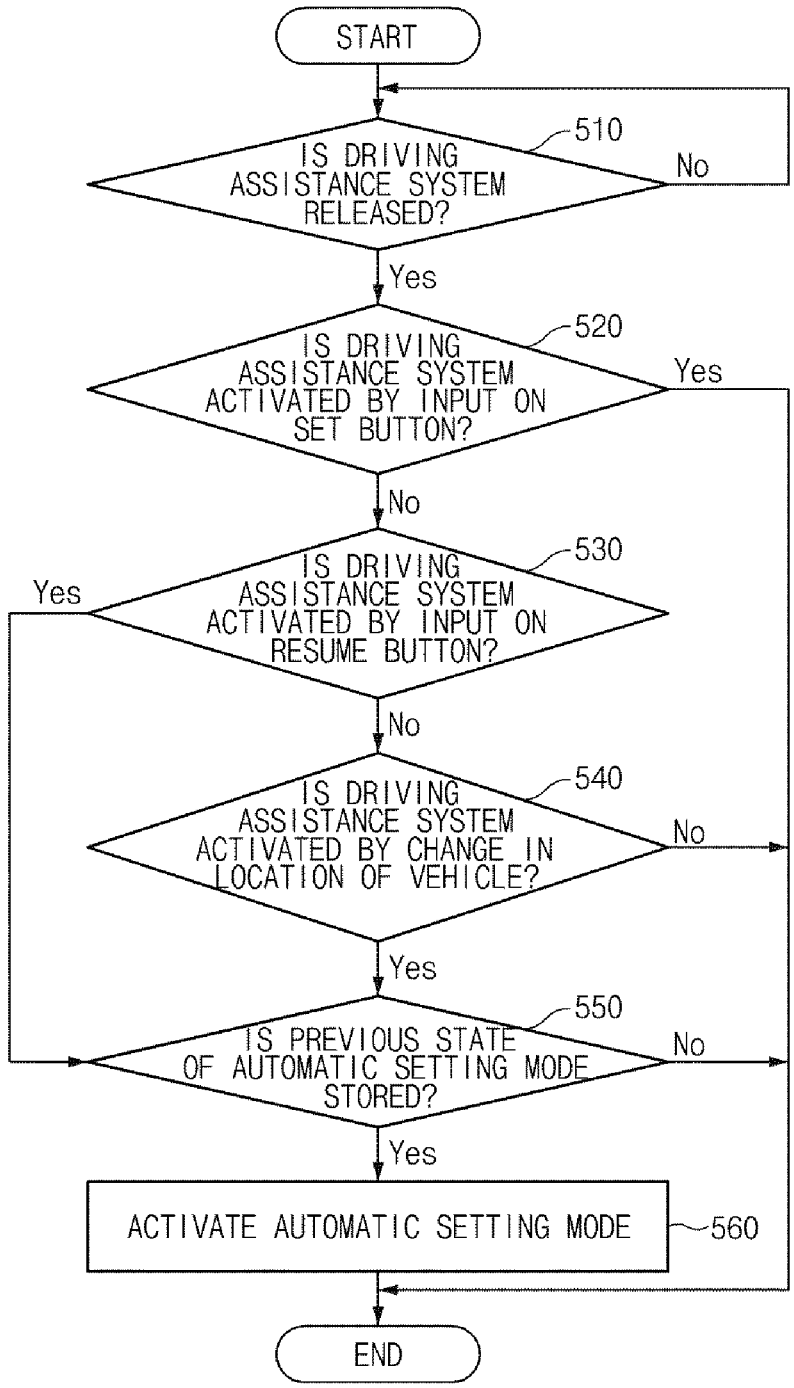
FIG. 5 is a flowchart illustrating a method for automatically setting a speed of a vehicle according to an exemplary embodiment of the present invention.

FIG. 5 is a flowchart illustrating a method for automatically setting a speed of a vehicle according to an exemplary embodiment of the present invention.

Hereinafter, it is assumed that an apparatus 200 of FIG. 2 performs a process of FIG. 5. Furthermore, in a description of FIG. 5, an operation referred to as being performed by an apparatus may be understood as being controlled by the controller 250 of the apparatus 200.

Referring to FIG. 5, in operation 510, the apparatus 200 may determine whether a driving assistance system is activated. For example, the driving assistance system may be activated by an operation of a user or automatically.

In operation 520, the apparatus 200 may determine whether the driving assistance system is activated by an input on a setting button. For example, when an input on the setting button occurs, the apparatus 200 may activate the driving assistance system and may set a setting speed to a current speed of a vehicle. In the present case, an automatic setting mode may be deactivated.

In operation 530, the apparatus 200 may determine whether the driving assistance system is activated by an input on a resume button. For example, when an input on the resume button occurs, the apparatus 200 may activate the driving assistance system and may perform operation 550.

In operation 540, the apparatus 200 may determine whether the driving assistance system is activated by a change in a location of a vehicle. For example, when the vehicle moves from a general road to a main line of a highway, the apparatus 200 may automatically activate the driving assistance system.

Operations 520 and 530 may be operations for determining whether to activate the automatic setting mode and may be changed in any order where operations 520 and 530 are performed. Portions of operations 520 and 530 may be omitted. Furthermore, the apparatus 200 may further perform another operation for determining whether to activate the automatic setting mode automatically.

In operation 550, the apparatus 200 may determine whether a previous state of the automatic setting mode is stored. For example, the apparatus 200 may determine whether a previous state of the automatic setting mode is stored in operation 460 of FIG. 4. The apparatus 200 may determine whether the automatic setting mode is previously and automatically released based on information related to the previous state.

When the previous state of the automatic setting mode is stored, in operation 560, the apparatus 200 may automatically activate the automatic setting mode.

Figure 6:
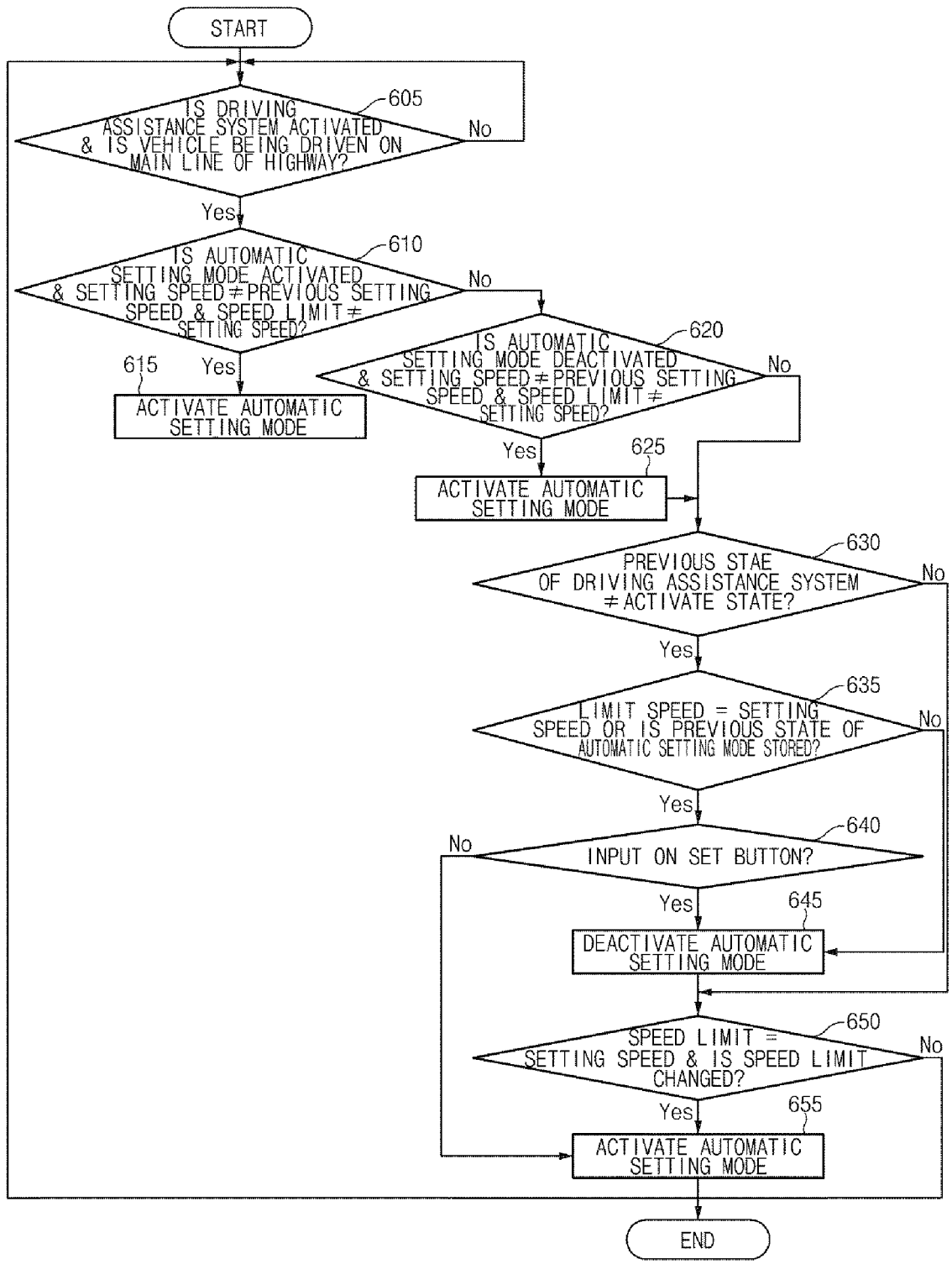
FIG. 6 is a flowchart illustrating a method for automatically setting a speed of a vehicle according to an exemplary embodiment of the present invention.

FIG. 6 is a flowchart illustrating a method for automatically setting a speed of a vehicle according to an exemplary embodiment of the present invention.

Hereinafter, it is assumed that an apparatus 200 of FIG. 2 performs a process of FIG. 6. Furthermore, in a description of FIG. 6, an operation referred to as being performed by an apparatus may be understood as being controlled by the controller 250 of the apparatus 200.

Referring to FIG. 6, in operation 605, the apparatus 200 may determine whether a driving assistance system is activated and whether the vehicle is being driven on a main line of a highway. When the condition is met, the apparatus 200 may perform operation 610.

In operation 610, the apparatus 200 may determine whether an automatic setting mode is activated, whether a setting speed is different from a previous setting speed (e.g., when the setting speed is changed while the automatic setting mode is activated), and whether a speed limit is different from the setting speed. When the condition is met, the apparatus 200 may perform operation 615. When the condition is not met, the apparatus 200 may perform operation 620.

In operation 615, the apparatus 200 may release the automatic setting mode. For example, after a setting speed is changed while the automatic setting mode is activated, when a speed limit is different from the setting speed, the apparatus 200 may release the automatic setting mode.

In operation 620, the apparatus 200 may determine whether the automatic setting mode is released, whether the setting speed is different from a previous setting speed, and whether a speed limit is identical to the setting speed. When the condition is met, the apparatus 200 may perform operation 625. When the condition is not met, the apparatus 200 may perform operation 630.

In operation 625, the apparatus 200 may activate the automatic setting mode. For example, after the setting speed is changed while the automatic setting mode is released, when the speed limit is identical to the setting speed, the apparatus 200 may activate the automatic setting mode.

In operation 630, the apparatus 200 may determine whether a previous state of the driving assistance system is an active state. For example, when the driving assistance system is activated by an operation of a user or when the driving assistance system is activated again after it is released by movement of a vehicle, the apparatus 200 may determine that the previous state of the driving system is not the active state. For another example, after the driving assistance system is automatically activated, when the driving assistance system is kept activated until the apparatus 200 performs operation 630, the apparatus 200 may determine that the previous state of the driving assistance system is the active state. When the condition is met, the apparatus 200 may perform operation 635. When the condition is met, the apparatus 200 may perform operation 650.

In operation 635, the apparatus 200 may determine whether the speed limit is identical to the setting speed or whether a previous state of the automatic setting mode is stored. For example, the apparatus 200 may determine whether a speed limit of a road where the vehicle is currently being driven is identical to a setting speed. Similar to operation 460, the apparatus 200 may determine whether a previous state of the automatic setting mode is stored. When the speed limit is identical to the setting speed or when the previous state of the automatic setting mode is stored, the apparatus 200 may perform operation 640. When the speed limit is different from the setting speed and when the previous state of the automatic setting mode is not stored, the apparatus 200 may perform operation 645.

In operation 640, the apparatus 200 may determine whether an input is provided to the setting button. When the condition is met, the apparatus 200 may perform operation 645. When the condition is not met, the apparatus 200 may perform operation 655.

In operation 650, the apparatus 200 may determine whether a speed limit is identical to a setting speed and when the speed limit is changed. When the condition is met, the apparatus 200 may perform operation 655. When the condition is not met, the apparatus 200 may perform operation 605 again.

In operation 655, the apparatus 200 may activate the automatic setting mode. For example, after the speed limit is changed, when the speed limit is identical to the setting speed, the apparatus 200 may activate the automatic setting mode.

Figure 9A:
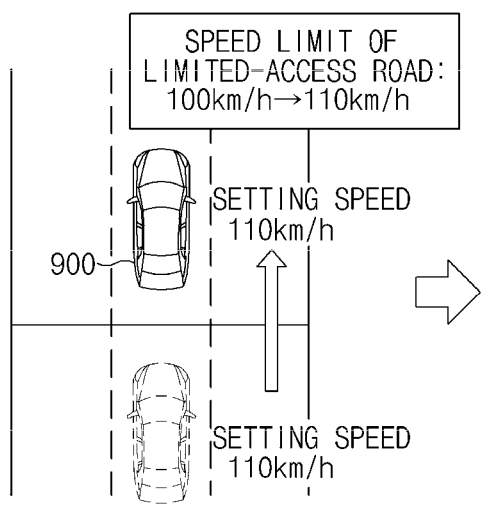
FIG. 9A and FIG. 9B are drawings illustrating an exemplary operation of an apparatus for automatically setting a speed of a vehicle according to an exemplary embodiment of the present invention.
Figure 9B:
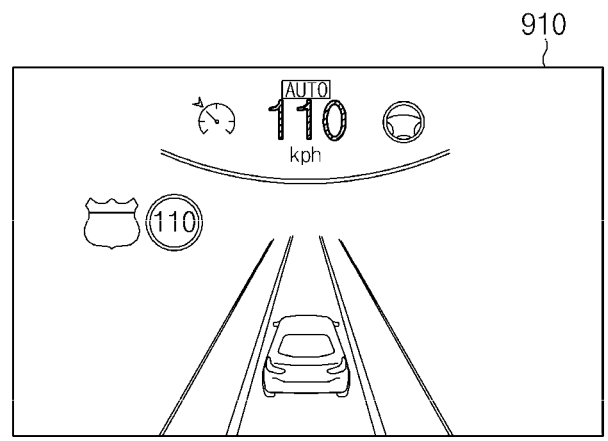

FIG. 7 is a drawing illustrating an exemplary operation of an apparatus for automatically setting a speed of a vehicle according to an exemplary embodiment of the present invention. FIG. 8 is a drawing illustrating an exemplary operation of an apparatus for automatically setting a speed of a vehicle according to an exemplary embodiment of the present invention. FIG. 9 is a drawing illustrating an exemplary operation of an apparatus for automatically setting a speed of a vehicle according to an exemplary embodiment of the present invention.

According to an exemplary embodiment of the present invention, when an automatic setting mode is activated, an apparatus (e.g., the controller 250 of FIG. 2) may output a notification that the automatic setting mode is activated, through an output device (e.g., the output device 230). According to an exemplary embodiment of the present invention, the apparatus may output at least part of a text, an icon, or an image indicating that the automatic setting mode is activated, on its display. According to an exemplary embodiment of the present invention, when the automatic setting mode is activated, the apparatus may change at least part of one or more objects displayed on the display. According to an exemplary embodiment of the present invention, when the automatic setting mode is activated, the apparatus may output a notification sound through a speaker. Hereinafter, referring to FIG. 7, FIG. 8, and FIG. 9, a description will be provided of a user interface for providing a notification that the automatic setting mode is activated.

Referring to FIG. 7, a vehicle 700 may be driven on a limited-access road where a speed limit is 100 km/h. A user of the vehicle 700 may operate a setting speed of the vehicle 700 as 100 km/h using an input device of the vehicle 700. When the setting speed is identical to the speed limit by the operation of the user, the vehicle 700 may activate the automatic setting mode. When the automatic setting mode is activated, the vehicle 700 may display a first screen 710 on its display. When the automatic setting mode is activated, the vehicle 700 may display an icon "AUTO" for providing a notification that the automatic setting mode is activated, on the first screen. When the automatic setting mode is activated, the vehicle 700 may change a color of the character "100" indicating a current speed on the first screen 710 (e.g., change a white color to a blue color).

Referring to FIG. 8, a vehicle 800 may be driven on a limited-access road in which a speed limit is 100 km/h. A user of the vehicle 800 may operate a setting speed of the vehicle 800 as 125 km/h using an input device of the vehicle 800. When the setting speed is different from the speed limit by the operation of the user, the vehicle 800 may release the automatic setting mode. When the automatic setting mode is released, the vehicle 800 may display a second screen 810 on its display. When the automatic setting mode is released, the vehicle 800 may remove the icon "AUTO" for providing a notification that the automatic setting mode is activated, from the second screen 810. When the automatic setting mode is released, the vehicle 800 may change a color of the character "125" indicating a current speed on the second screen 810 (e.g., change the blue color to the white color).

Referring to FIG. 9, a vehicle 900 may be driven on a limited-access road where a speed limit is 100 km/h. A user of the vehicle 900 may operate a setting speed of the vehicle 900 as 110 km/h using an input device of the vehicle 900. The vehicle 900 may move to an interval where the speed limit is 110 km/h. When the setting speed is identical to the speed limit by movement of the vehicle 900, the vehicle 900 may activate the automatic setting mode. When the automatic setting mode is activated, the vehicle 900 may display a third screen 910 on its display. When the automatic setting mode is activated, the vehicle 900 may display the icon "AUTO" for providing a notification that the automatic setting mode is activated, on the third screen 910. When the automatic setting mode is activated, the vehicle 900 may change a color of the character "110" indicating a current speed on the third screen 910 (e.g., change the white color to the blue color)

Figure 10:
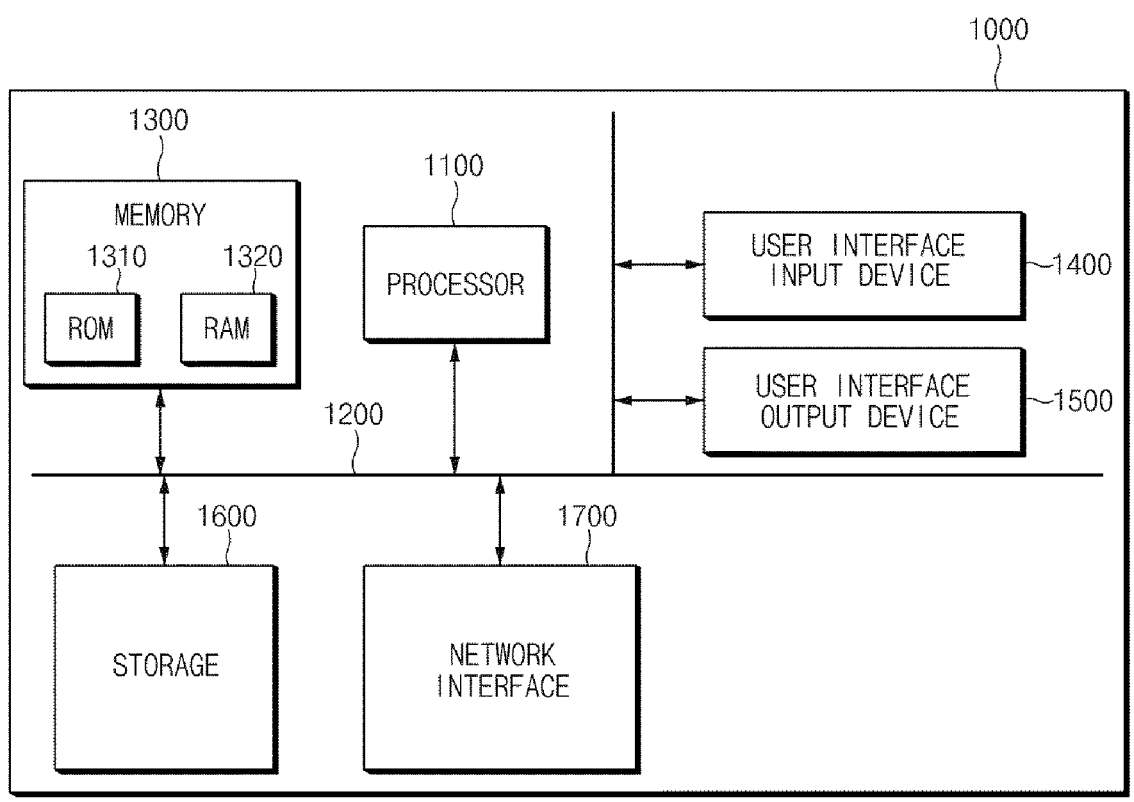
FIG. 10 is a diagram illustrating a configuration of a computing system which executes a user input processing method, according to an exemplary embodiment of the present invention.

FIG. 10 is a diagram illustrating a configuration of a computing system which executes a user input processing method according to an exemplary embodiment of the present invention.

Referring to FIG. 10, the user input processing method according to an exemplary embodiment of the present invention may be implemented through a computing system. A computing system 1000 includes at least one processor 1100, a memory 1300, a user interface input device 1400, a user interface output device 1500, a storage 1600, and a network interface 1700, which are connected to each other via a bus 1200.

The processor 1100 may be a central processing unit (CPU) or a semiconductor device configured for executing processing of instructions stored in the memory 1300 and/or the storage 1600. Each of the memory 1300 and the storage 1600 may include various types of volatile or non-volatile storage media. For example, the memory 1300 may include a read only memory (ROM) 1310 and a random access memory (RAM) 1320.

Thus, the operations of the methods or algorithms described in connection with the exemplary embodiments in the specification may be directly implemented with a hardware module, a software module, or combinations thereof, executed by the processor 1100. The software module may reside on a storage medium (i.e., the memory 1300 and/or the storage 1600) including a RAM, a flash memory, a ROM, an erasable and programmable ROM (EPROM), an electrically EPROM (EEPROM), a register, a hard disc, a removable disc, or a compact disc-ROM (CD-ROM). An exemplary storage medium may be coupled to the processor 1100. The processor 1100 may read information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as a separate component of the user terminal.

The apparatus and method for automatically setting a speed according to an exemplary embodiment of the present invention may enhance convenience of the user by determining whether the automatic setting mode is activated by reflecting the intention of the user.

For convenience in explanation and accurate definition the appended claims, the terms "upper", "lower", "up", "down", "upwards", "downwards", "internal", "outer", "inside", "outside", "inwardly", "outwardly", "internal", "external", "front", "rear", "back", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for automatically setting a speed of a vehicle, the apparatus comprising:
   a path guide device configured to obtain information related to a location of the vehicle, a road type of a road corresponding to the location, and a speed limit of the road corresponding to the location; and
   a controller configured to be electronically connected to the path guide device,
   wherein the controller is configured to:
   when a predetermined condition is met while the vehicle is located on a predetermined road type, activate an automatic setting mode for setting a setting speed for autonomous driving of the vehicle to a predetermined speed limit of a road corresponding to a current location of the vehicle;
   when the vehicle enters another road type from the predetermined road type in a state where the automatic setting mode is activated, release the automatic setting mode,
   when the vehicle enters the predetermined road type in a state where the automatic setting mode is released, activate the automatic setting mode,
   when the setting speed is identical to the predetermined speed limit of the road corresponding to the current location, while the vehicle is located on the predetermined road type, activate the automatic setting mode, and
   when the vehicle drives on a limited-access road where a speed limit is a first speed and a user of the vehicle sets the setting speed of the vehicle as a second speed, the vehicle moves to an interval where the speed limit is the second speed.

2. The apparatus of claim 1, wherein the controller is configured to:
   when the vehicle enters another road type from the predetermined road type in a state where the automatic setting mode is activated, store or change information indicating a setting state of the automatic setting mode; and
   when the vehicle enters the predetermined road type in a state where the information indicating the setting state is stored or changed, activate the automatic setting mode.

3. The apparatus of claim 1, wherein the controller is configured to:
   release the automatic setting mode depending on an operation of the user of the vehicle in a state where the automatic setting mode is activated; and
   when the vehicle enters the predetermined road type in a state where the automatic setting mode is released due to the operation, deactivate the automatic setting mode.

4. The apparatus of claim 1, wherein the controller is configured to:
   when a pedal included in the vehicle is operated in a state where the automatic setting mode is activated, release the automatic setting mode; and
   when the vehicle enters the predetermined road type in a state where the automatic setting mode is released due to the operation of the pedal, deactivate the automatic setting mode.

5. The apparatus of claim 1, further including:
   an input device configured to include one or more buttons,
   wherein the controller is configured to:
   when an input is provided to a cancel button included in the input device in the state where the automatic setting mode is activated, release the automatic setting mode; and
   when the vehicle enters the predetermined road type in a state where the automatic setting mode is released due to the input, deactivate the automatic setting mode.

6. The apparatus of claim 1, further including:
   an input device configured to include one or more buttons,
   wherein the controller is configured to:
   when an input is provided to a resume button included in the input device in the state where the automatic setting mode is released, activate the automatic setting mode, and
   wherein the resume button is a button for setting the setting speed to a previous setting speed of the vehicle.

7. The apparatus of claim 1, further including:
   an input device configured to include one or more buttons,
   wherein the controller is configured to:
   when an input is provided to a setting button included in the input device in the state where the automatic setting mode is released, deactivate the automatic setting mode, and
   wherein the setting button is a button for setting the setting speed to a current driving speed of the vehicle.

8. The apparatus of claim 1, further including:
   a display configured to be electronically connected to the controller,
   wherein the controller is configured to:
   when the automatic setting mode is activated, output at least part of a text, an icon, or an image, indicating that the automatic setting mode is activated, on the display.

9. The apparatus of claim 1, further including:
   a display configured to be electronically connected to the controller,
   wherein the controller is configured to:

when the automatic setting mode is activated, change at least part of one or more objects displayed on the display.

10. The apparatus of claim 1, further including:
a speaker configured to be electronically connected to the controller,
wherein the controller is configured to:
when the automatic setting mode is activated, output a notification sound using the speaker.

11. A method for automatically setting a speed of a vehicle, the method comprising:
when a predetermined condition is met while the vehicle is located on a predetermined road type, activating, by a controller, an automatic setting mode for setting a setting speed for autonomous driving of the vehicle to a predetermined speed limit of a road corresponding to a current location of the vehicle;
when the vehicle enters another road type from the predetermined road type in a state where the automatic setting mode is activated, releasing, by the controller, the automatic setting mode,
when the vehicle enters the predetermined road type in a state where the automatic setting mode is released, reactivating the automatic setting mode,
when the setting speed is identical to the predetermined speed limit of the road corresponding to the current location while the vehicle is located on the predetermined road type, activating the automatic setting mode, and
when the vehicle drives on a limited-access road where a speed limit is a first speed and a user of the vehicle sets the setting speed of the vehicle as a second speed, the vehicle moves to an interval where the speed limit is the second speed.

12. The method of claim 11, wherein the releasing of the automatic setting mode including:
when the vehicle enters another road type from the predetermined road type in the state where the automatic setting mode is activated, storing or changing information indicating a setting state of the automatic setting mode, and
wherein the reactivating includes:
when the vehicle enters the predetermined road type in a state where the information indicating the setting state is stored or changed, reactivating the automatic setting mode.

13. The method of claim 11, further including:
releasing the automatic setting mode depending on an operation of the user of the vehicle in the state where the automatic setting mode is activated; and
when the vehicle enters the predetermined road type in a state where the automatic setting mode is released due to the operation, deactivating the automatic setting mode.

14. An apparatus for automatically setting a speed of a vehicle, the apparatus comprising:
a path guide device configured to obtain information related to a location of the vehicle, information related to a road type corresponding to the location, and information related to a speed limit of the road corresponding to the location; and
a controller configured to be electronically connected with the path guide device,
wherein the controller is configured to:
when a predetermined condition is met while the vehicle is located on a predetermined road type, activate an automatic setting mode for setting a setting speed for autonomous driving of the vehicle to a predetermined speed limit of a road corresponding to a current location of the vehicle;
when the vehicle reenters the predetermined road type in a state where the automatic setting mode is released due to a change in the location of the vehicle, reactivate the automatic setting mode, and
wherein when the setting speed is identical to the predetermined speed limit of the road corresponding to the current location while the vehicle is located on the predetermined road type, activate the automatic setting mode, and
wherein when the vehicle drives on a limited-access road where a speed limit is a first speed and a user of the vehicle sets the setting speed of the vehicle as a second speed, the vehicle moves to an interval where the speed limit is the second speed.

15. The apparatus of claim 14, wherein the controller is configured to:
when the automatic setting mode is released due to the change in the location of the vehicle, store or change information indicating a setting state of the automatic setting mode; and
when the vehicle enters the predetermined road type again in a state where the information indicating the setting state is stored or changed, reactivating the automatic setting mode.

16. The apparatus of claim 14, wherein the controller is configured to:
when the location of the vehicle is changed from the predetermined road type to another road type, release the automatic setting mode.

17. The apparatus of claim 14, wherein the controller is configured to:
when the vehicle enters the predetermined road type again in a state where the automatic setting mode is released by an operation of the user of the vehicle, deactivate the automatic setting mode.

18. The apparatus of claim 17, wherein the operation of the user includes an operation for a pedal or an input device included in the vehicle.

* * * * *